United States Patent
O'Neill et al.

(10) Patent No.: US 12,074,879 B2
(45) Date of Patent: Aug. 27, 2024

(54) INFERRING TRUST IN COMPUTER NETWORKS

(71) Applicant: Juniper Networks, Inc., Sunnyvale, CA (US)

(72) Inventors: Charles Damian O'Neill, Ballymena (GB); Kieran Gerald McPeake, Belfast (GB); Simon James, Newtownards (GB); Hayden Paul Shorter, Bangor (GB)

(73) Assignee: Juniper Networks, Inc., Sunnyvale, CA (US)

( * ) Notice: Subject to any disclaimer, the term of this patent is extended or adjusted under 35 U.S.C. 154(b) by 250 days.

(21) Appl. No.: 17/474,871

(22) Filed: Sep. 14, 2021

(65) Prior Publication Data
US 2023/0083952 A1 Mar. 16, 2023

(51) Int. Cl.
*H04L 9/40* (2022.01)
*G06N 5/04* (2023.01)
*H04L 41/12* (2022.01)

(52) U.S. Cl.
CPC ............ *H04L 63/102* (2013.01); *G06N 5/04* (2013.01); *H04L 41/12* (2013.01); *H04L 63/105* (2013.01); *H04L 63/1433* (2013.01)

(58) Field of Classification Search
CPC .......... G06N 5/04; H04L 41/12; H04L 63/20; H04L 63/105; H04L 63/1433; H04L 63/102; H04L 63/1425; H04L 45/70
(Continued)

(56) References Cited

U.S. PATENT DOCUMENTS 7,558,884 B2 7/2009 Fuller et al.
7,788,700 B1 * 8/2010 Feezel ................ H04L 63/1416
713/168
(Continued)

FOREIGN PATENT DOCUMENTS

CN 1716177 A 1/2006
CN 101507229 A 8/2009
(Continued)

OTHER PUBLICATIONS

U.S. Appl. No. 16/949,996, filed Nov. 23, 2020, naming inventors Grammel et al.
(Continued)

*Primary Examiner* — Amare F Tabor
(74) *Attorney, Agent, or Firm* — Shumaker & Sieffert, P.A.

(57) ABSTRACT

This disclosure describes techniques that include assessing trust in a computer network. In one example, this disclosure describes a method that includes determining a level of trust that a first network entity has for a second network entity; determining a level of trust that the second network entity has for a third network entity; determining that the first network entity is separated from the third network entity by the second network entity; determining, based on the level of trust that the first network entity has for the second network entity and further based on the level of trust that the second network entity has for the third network entity, a level of trust that the first network entity has for the third network entity; and enabling, based on the level of trust that the first network entity has for the third network entity, the first network entity to perform an operation with the third network entity.

18 Claims, 7 Drawing Sheets

(58) Field of Classification Search
USPC .............................................. 726/22, 23–25
See application file for complete search history.

(56) References Cited

U.S. PATENT DOCUMENTS

| | | | |
|---|---|---|---|
| 7,895,068 B2* | 2/2011 | LaSalle | H04L 63/105 |
| | | | 705/7.11 |
| 8,549,622 B2* | 10/2013 | Byrne | G06F 21/6218 |
| | | | 713/188 |
| 9,363,283 B1* | 6/2016 | Herrera-Yagüe | G06F 21/57 |
| 9,679,254 B1* | 6/2017 | Mawji | G06F 16/24578 |
| 9,860,275 B2* | 1/2018 | Kleinpeter | H04L 9/3271 |
| 10,068,095 B1 | 9/2018 | Segal et al. | |
| 10,237,293 B2 | 3/2019 | Hajmasan et al. | |
| 10,432,605 B1 | 10/2019 | Lester et al. | |
| 10,491,594 B2 | 11/2019 | Yan | |
| 10,511,510 B2 | 12/2019 | Ricci | |
| 10,855,619 B1 | 12/2020 | Andrews et al. | |
| 10,855,725 B2 | 12/2020 | Pai et al. | |
| 10,924,377 B2* | 2/2021 | Chauhan | H04L 63/08 |
| 10,958,673 B1 | 3/2021 | Chen et al. | |
| 11,386,129 B2 | 7/2022 | Chrapko et al. | |
| 11,503,061 B1 | 11/2022 | Lin et al. | |
| 11,640,569 B2 | 5/2023 | Chrapko | |
| 11,683,331 B2 | 6/2023 | Grammel et al. | |
| 2006/0248573 A1* | 11/2006 | Pannu | H04L 63/08 |
| | | | 726/1 |
| 2007/0107059 A1* | 5/2007 | Chasin | H04L 63/1416 |
| | | | 726/23 |
| 2007/0147594 A1 | 6/2007 | Aaron et al. | |
| 2009/0100504 A1 | 4/2009 | Conner et al. | |
| 2009/0172776 A1* | 7/2009 | Makagon | H04L 45/306 |
| | | | 726/2 |
| 2010/0220613 A1 | 9/2010 | Hendriks et al. | |
| 2011/0280160 A1 | 11/2011 | Yang | |
| 2013/0298192 A1 | 11/2013 | Kumar et al. | |
| 2015/0074390 A1 | 3/2015 | Stoback et al. | |
| 2015/0156208 A1 | 6/2015 | Kirkham et al. | |
| 2015/0180903 A1 | 6/2015 | Cooper et al. | |
| 2015/0312267 A1 | 10/2015 | Thomas | |
| 2016/0191540 A1* | 6/2016 | Fuka | H04W 12/08 |
| | | | 726/4 |
| 2016/0261613 A1 | 9/2016 | Farmer et al. | |
| 2016/0373486 A1 | 12/2016 | Kraemer | |
| 2017/0171231 A1 | 6/2017 | Reybok, Jr. et al. | |
| 2018/0075563 A1 | 3/2018 | Ananthanpillai et al. | |
| 2018/0091453 A1 | 3/2018 | Jakobsson | |
| 2018/0183827 A1 | 6/2018 | Zorlular et al. | |
| 2019/0182286 A1 | 6/2019 | Zini | |
| 2019/0207954 A1 | 7/2019 | Ahuja et al. | |
| 2019/0268366 A1 | 8/2019 | Zeng et al. | |
| 2020/0012796 A1 | 1/2020 | Trepagnier et al. | |
| 2020/0067935 A1 | 2/2020 | Carnes, III et al. | |
| 2020/0302540 A1 | 9/2020 | Xiu | |
| 2020/0356676 A1 | 11/2020 | Gorlamandala | |
| 2021/0029152 A1 | 1/2021 | Charles et al. | |
| 2021/0273968 A1 | 9/2021 | Al Shaieb et al. | |
| 2021/0409405 A1 | 12/2021 | Salajegheh et al. | |
| 2022/0043913 A1 | 2/2022 | Keith, Jr. | |
| 2022/0103592 A1 | 3/2022 | Semel et al. | |
| 2022/0210142 A1 | 6/2022 | Sohail et al. | |
| 2022/0329630 A1 | 10/2022 | Li | |
| 2022/0345394 A1 | 10/2022 | Vasseur et al. | |
| 2023/0083952 A1 | 3/2023 | O'Neill et al. | |
| 2023/0185943 A1* | 6/2023 | Zhang | H04L 12/2823 |
| | | | 726/29 |
| 2023/0188527 A1 | 6/2023 | O'Neill et al. | |
| 2023/0300150 A1 | 9/2023 | O'Neill et al. | |

FOREIGN PATENT DOCUMENTS

| | | |
|---|---|---|
| CN | 106575323 A | 4/2017 |
| CN | 108075925 A | 5/2018 |
| CN | 109196505 A | 1/2019 |
| CN | 109564669 A | 4/2019 |
| CN | 109891422 A | 6/2019 |
| CN | 109948911 A | 6/2019 |
| CN | 110313009 A | 10/2019 |
| EP | 1832059 A1 | 9/2007 |
| EP | 3343864 A1 | 7/2018 |
| EP | 4002795 A1 | 5/2022 |
| WO | 2006070172 A1 | 7/2006 |
| WO | 2006094275 A2 | 9/2006 |

OTHER PUBLICATIONS

"Overview of Risks Introduced By 5G Adoption in the United States," Critical Infrastructure Security and Resilience Note, Cybersecurity and Infrastructure Security Agency, Jul. 31, 2019, 16 pp.

"Cybersecurity of 5G networks EU Toolbox of risk mitigating measures," NIS Cooperation Group, CG Publication, Jan. 2020, 45 pp.

"Time Guidance for Network Operators, Chief Information Officers, and Chief Information Security Officers," Cybersecurity and Infrastructure Security Agency, Jun. 2020, 18 pp.

Conran, "Zero Trust Networking (ZTN): don't trust anything," The Network Architect, Sep. 18, 2018, 7 pp.

Extended Search Report from counterpart European Application No. 22150744.5 dated Jun. 27, 2022, 9 pp.

Communication pursuant to Article 94(3) EPC from counterpart European Application No. 22150744.5 dated Dec. 20, 2023, 7 pp.

Response to Extended Search Report dated Jun. 27, 2022, from counterpart European Application No. 22150744.5 filed Sep. 14, 2023, 17 pp.

U.S. Appl. No. 18/353,575, filed Jul. 17, 2023, by O'Neill et al.

CIS Benchmarks, "CIS Cisco IOS 15 Benchmark", National Institute of Standards and Technology, vol. 4, No. 1, Apr. 11, 2022, 214 pp., URL: https://ncp.nist.gov/checklist/599.

Omeyer, "7 Top Metrics for Measuring Your Technical Debt", Jan. 13, 2022, 6 pp., URL: https://dev.to/alexomeyer/8-top-metrics-for-measuring-your-technical-debt-5bnm.

U.S. Appl. No. 17/644,555, filed Dec. 15, 2021, naming inventors O'Neill et al.

U.S. Appl. No. 17/655,140, filed Mar. 16, 2022, naming inventors O'Neill et al.

U.S. Appl. No. 18/148,762, filed Dec. 30, 2022, naming inventors Grammel et al.

Jian et al., "Dynamic Evaluation Method of Network Trust based on Conngnitive Behavior," Communications Technology, vol. 49, No. 9, Sep. 2016, 6 pp.

Lu et al., "Trust Evaluation in Networked Manufacturing Environment," Journal of WUT, vol. 35 No. 2, Apr. 2013, 4 pp.

Office Action from U.S. Appl. No. 17/655,140 dated May 20, 2024, 21 pp.

Response to Communication pursuant to Article 94(3) EPC dated Dec. 20, 2023, from counterpart European Application No. 22150744.5 filed Apr. 18, 2024, 10 pp.

\* cited by examiner

INFERRING TRUST IN COMPUTER NETWORKS

TECHNICAL FIELD

The disclosure relates to security in computer networks.

BACKGROUND

Zero-trust networking is an approach to network security in which network administrators assume that network entities should not be trusted by default, even if those network entities are in a private network or previously verified. Example types of network entities may include network nodes (e.g., endpoint devices, intermediate network devices, etc.), network services, or other types of real or virtual entities that can be identified on a computer network. Because network entities are not trusted by default in zero-trust networking, identity and integrity checks are routinely performed on network entities, even if such entities are part of a private computer network.

SUMMARY

This disclosure describes techniques that include assessing trust in a system, and in particular, assessing the extent to which an entity in a system can trust another entity in the system. As described herein, and in a networking context, a computing system may assess the extent to which a network entity or network device can trust another entity in a computer network. Making such a determination may involve determining the distance or separation between the entities, where the distance or separation might be defined by attributes of paths between the network entities and/or intervening network devices on such paths. In some cases, the trust between two network entities can be inferred based on the distance or separation between them, and also based on the extent to which intervening network entities are trusted.

As described herein, a trust score, or a level of trust, for a network entity may be calculated, and the trust score may be based, at least in part, on the inferred trust. In some examples, a trust score may be calculated and then adjusted appropriately based on a set of trust inferences. Where intervening devices between two network entities are trusted, the trust score may be higher; where intervening devices are not trusted, the trust score may be lower.

A computing system may use trust scores in various ways, including by performing or enabling performance of various actions based on the trust scores of the network devices or entities. For instance, in some examples, the computing system may modify traffic patterns in a computer network based on trust scores and/or trust relationships.

Although some examples herein may be described in terms of entities that take the form of network devices, computing devices, and/or computing services (e.g., "network entities"), techniques described herein may apply to other types of entities. Such entities may be, for example, quantitative or qualitative entities.

In some examples, this disclosure describes operations performed by a controller or network device in accordance with one or more aspects of this disclosure. In one specific example, this disclosure describes a method comprising determining, by a computing system, a level of trust that a first network entity has for a second network entity; determining, by the computing system, a level of trust that the second network entity has for a third network entity; determining, by the computing system, that the first network entity is separated from the third network entity by the second network entity; determining, by the computing system and based on the level of trust that the first network entity has for the second network entity and further based on the level of trust that the second network entity has for the third network entity, a level of trust that the first network entity has for the third network entity; and enabling, by the computing system and based on the level of trust that the first network entity has for the third network entity, the first network entity to perform an operation with the third network entity.

In another example, this disclosure describes a system comprising a storage device and processing circuitry having access to the storage device, wherein the processing circuitry is configured to: determine a level of trust that a first network entity has for a second network entity; determine a level of trust that the second network entity has for a third network entity; determine that the first network entity is separated from the third network entity by the second network entity; determine, based on the level of trust that the first network entity has for the second network entity and further based on the level of trust that the second network entity has for the third network entity, a level of trust that the first network entity has for the third network entity; and enable, based on the level of trust that the first network entity has for the third network entity, the first network entity to perform an operation with the third network entity.

In another example, this disclosure describes a computer-readable storage medium comprising instructions that, when executed, configure processing circuitry of a computing system to determine a level of trust that a first entity has for a second entity; determine a level of trust that a first network entity has for a second network entity; determine a level of trust that the second network entity has for a third network entity; determine that the first network entity is separated from the third network entity by the second network entity; determine, based on the level of trust that the first network entity has for the second network entity and further based on the level of trust that the second network entity has for the third network entity, a level of trust that the first network entity has for the third network entity; and enabling, based on the level of trust that the first network entity has for the third network entity, the first network entity to perform an operation with the third network entity.

DETAILED DESCRIPTION

Figure 1A:
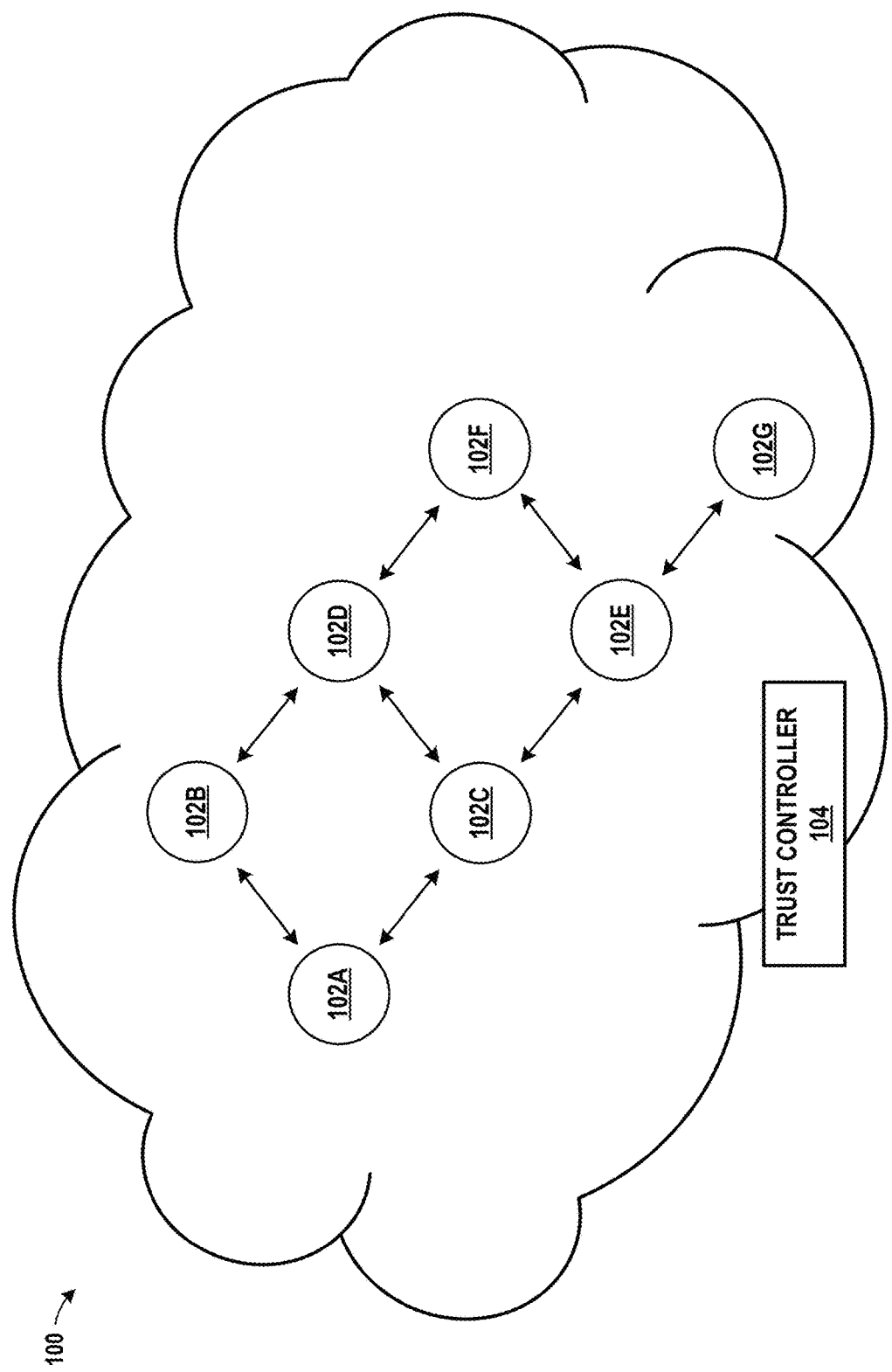
FIG. 1A is a block diagram illustrating an example computer network in accordance with one or more aspects of this disclosure.

FIG. 1A is a block diagram illustrating an example computer network 100 in accordance with one or more aspects of this disclosure. Computer network 100 may include various types of computer networks, such as private networks (e.g., internal corporate or government networks), virtual private networks, residential networks, etc.) or public networks (e.g., cellular communication networks, Internet backbone networks, etc.).

In the example of FIG. 1A, computer network 100 includes a set of network entities 102A through 102G, where "G" may be any number. This disclosure may refer to network entities 102A through 102G collectively as "network entities 102." In general, each of network entities 102 is individually addressable within computer network 100 and can send and receive data on computer network 100. One or more of network entities 102 may be computing nodes, such as real or virtual endpoint devices (e.g., personal computers, smartphones, tablet computers, server devices, laptop computers, Internet of Things (IoT) devices, wearable devices, etc.) or real or virtual intermediate devices (e.g., routers, switches, firewall devices, virtualized appliances, etc.). In some examples, one or more of network entities 102 may be network services, such as web servers, certain application programming interfaces (APIs), media streaming services, and so on. Other types of network entities may include components, controllers, and routes through computer network 100.

As mentioned above, computer networks such as computer network 100 may be designed to operate using a zero-trust networking architecture. When a computer network operates using a zero-trust networking architecture, numerous authentication and security checks are performed (e.g., each time a service is requested from a network entity in the computer network). Performing such checks may be resource intensive and may increase network latency. Accordingly, to increase network performance in computer networks that operate using zero-trust networking architectures, network administrators may reduce the intensity of checks with respect to specific network entities on an ad hoc basis. While doing so may increase network performance, doing so may undermine the overall security of the computer network because there is no systematic methodology for reducing the intensity of checks with respect to individual network entities. Rather, such reductions in the intensity of checks may be based on a network administrator's experience and intuition. This may lead to inconsistencies and misconfigurations in the computer network, e.g., because knowledge of the reductions in the intensity of checks might not be transferred between network administrators. Ultimately, this may lead to adverse outcomes, such as security breaches and network outages.

This disclosure describes techniques that may address one or more of these issues. For instance, as shown in the example of FIG. 1A, computer network 100 includes a trust controller 104. Trust controller 104 is a computing system that comprises one or more computing devices, such as one or more server devices, personal computing devices, or other types of computing devices. In some examples described herein, trust controller 104 determines a level of trust for network entities 102 in computer network 100. In some examples, a level of trust may be expressed as a number or a trust "score." In other examples, a level of trust may be expressed as a category of trust values that indicate a more or less granular continuum of trust values (e.g., "highly trusted," "trusted," "untrusted," "trust unverified"), or categories of trust values for certain operations ("trusted for data transfer," "trusted for testing,"). In still other examples, a level of trust may be expressed as a binary value (e.g., "trusted" or "untrusted").

Although many examples of this disclosure are described in the context of calculating a "trust score," such examples may alternatively be implemented using a "level of trust." Similarly, examples described in terms of a "level of trust" could also be implemented using a trust score. In that sense, therefore, the terms "trust score" and "level of trust" may, depending on the context, be used herein interchangeably.

Additionally, trust controller 104 may use the trust scores for network entities 102 to perform various actions with respect to computer network 100. In some examples, one or more computing systems other than trust controller 104 may determine trust scores and/or use the trust scores for network entities 102 to perform actions with respect to computer network 100. However, for ease of explanation, at least some examples herein describe trust controller 104 as calculating trust scores and performing actions. In such examples, because trust controller 104 determines the trust scores in a predictable, reproducible way, the trust scores may be applied consistently throughout network entities of computer network 100. Thus, inconsistencies associated with ad hoc adjustments to checking may be reduced and there may be less need for documentation to pass knowledge of security procedures between network administrators. Trust controller 104 may be implemented as a single trust controller or as (or within) a system (e.g., a hierarchy) of two or more trust controllers. In examples where trust controller 104 is implemented as a system of trust controllers, the trust controllers of trust controller 104 may correspond to specific classes of network entities, different network entities in sub-networks of computer network 100, or other groupings of network entities.

Trust controller 104 may determine trust scores for network entities 102. The trust score for a network entity indicates a level of trust in the network entity. In general, there is greater trust in a network entity if the network entity has previously performed in a manner that is desired by administrators of computer network 100. Conversely, there is less trust in a network entity if the network entity has not performed in a manner that is desired by administrators of computer network 100. For example, the trust score for a network entity may indicate low trust if the network entity is known to be compromised by malware, if the network entity is known to generate corrupted data, if the network entity is known to have frequent service outages, if the network entity has known unpatched security flaws, and so on.

Contribution classes are classes of information that contribute to the trust score for a network entity. In some examples, the contribution classes include one or more of a set of prerequisites for the network entity, a set of variable factors for the network entity, and/or a set of reputation factors for the network entity.

In some examples, there may be a separate sub-score for each of the contribution classes. For instance, there may be a first sub-score for the prerequisites for the network entity, a second sub-score for the variable factors for the network entity, and a third sub-score for the reputation factors for the network entity. In some examples, the sub-score for a contribution class is expressed as a percentage of a highest possible sub-score for the contribution class. In other examples, sub-scores for contribution classes are expressed in other ways. Trust controller 104 may use the sub-scores for the contribution classes (e.g., the first, second, and third sub-scores) for the network entity to determine the trust score for the network entity. Thus, the trust score for the network entity may be the result of a mathematic computation that is based on one or more of the prerequisites for the network entity, the variable factors for the network entity, and/or the reputation factors for the network entity.

Each of the prerequisites for the network entity is, in general, a condition that must be satisfied for the trust score for the network entity to have a value greater than a minimum value (e.g., 0). In this disclosure, a trust score for a network entity having the minimum value means that a lowest trust level (e.g., no trust) is afforded to the network entity. In some examples, the minimum value may be equal to 0. However, values other than 0 may be used to represent a trust score indicating no trust.

The variable factors for a network entity correspond to current characteristics of the network entity. Example characteristics of a network entity may include a current configuration of the network entity, a version of the network entity, active features of the network entity, and so on. The variable factors may be weighted such that some of the variable factors contribute more to the variable factors sub-score than other ones of the variable factors.

Each of the reputation factors for a network entity may be a function of specified historical events involving the network entity. For example, trust controller 104 modifies the values of reputational factors for a network entity based on behavior of the network entity over time. For example, trust controller 104 may modify the value of one reputation factor based on the number of times that the network entity spontaneously reboots. In another example, trust controller 104 may modify the value of a reputation factor based on the number of times the network entity has been reconfigured.

Trust controller 104 may determine a trust score for a network entity based on several factors. For instance, trust controller 104 may determine a trust score for a network entity based on one or more contribution classes and/or by inferring trust based on other known trust relationships in the network. Trust controller 104 may also consider attributes of entities that separate one entity from another entity. For example, if network entity 102A trusts network entity 102C, and network entity 102C trusts network entity 102E, network entity 102A may trust network entity 102E to some extent, since network entity 102A trusts an entity that also trusts network entity 102E. In such an example, the trust score for network entity 102E may be increased for operations that network entity 102A may perform with network entity 102E (e.g., a transfer of data). Network entity 102A might not have any direct interactions with network entity 102E, but network entity 102A might be able to infer a trust relationship with network entity 102E, based on the trust network entity 102A has in intervening entities (e.g., network entity 102C).

On the other hand, if network entity 102A trusts network entity 102C, but network entity 102C does not trust network entity 102E, then network entity 102A might not trust network entity 102E, since network entity 102C (an entity that network entity 102A trusts) does not trust network entity 102E. In this example, the trust score for network entity 102E may be decreased for operations that network entity 102A. Network entity 102A may therefore determine a trust inference with respect to network entity 102E that is based on its level of trust with network entity 102C and network entity 102C's level of trust with network entity 102E.

Figure 1B:
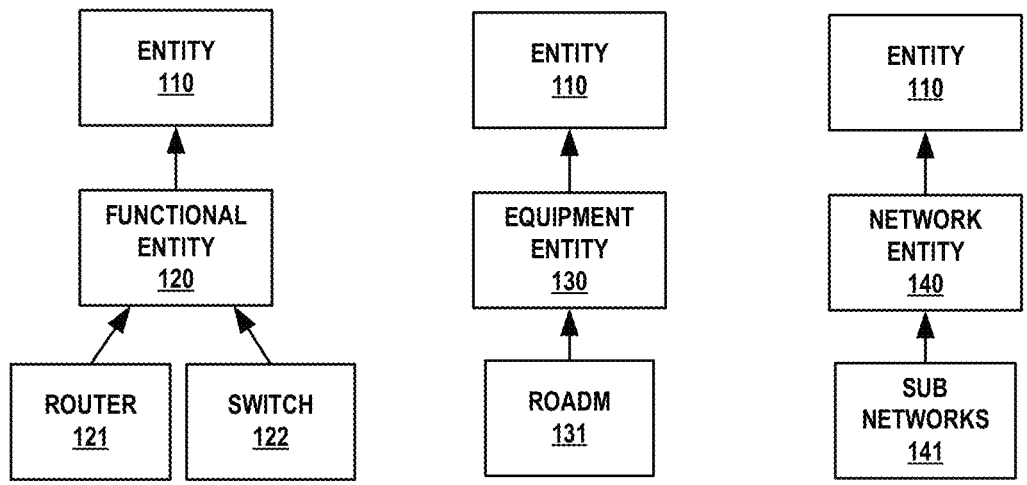
FIG. 1B, FIG. 1C, and FIG. 1D are conceptual diagrams illustrating various types of entity specializations, in accordance with one or more aspects of the present disclosure.
Figure 1C:
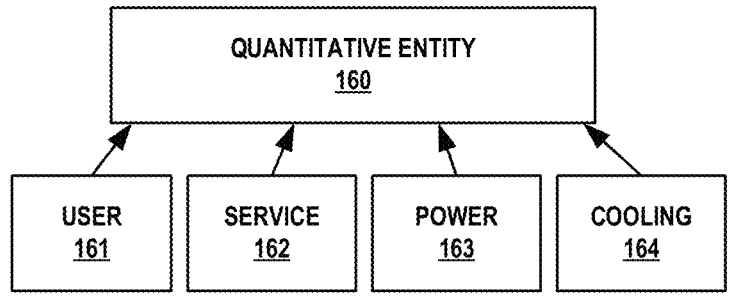
Figure 1D:
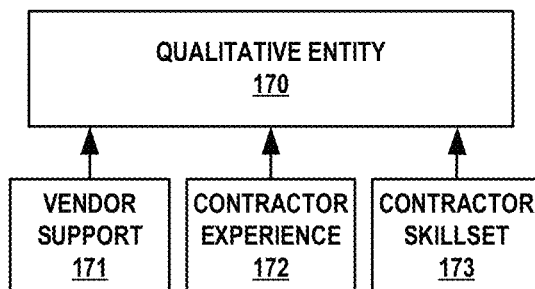

Further details relating to trust scoring, particularly in the context of computer networks, are available in U.S. patent application Ser. No. 16/949,996, filed Nov. 23, 2020, entitled "Trust Scoring of Network Entities in Networks,", the entire content of which is incorporated herein by reference FIG. 1B, FIG. 1C, and FIG. 1D are conceptual diagrams illustrating various types of entity specializations, in accordance with one or more aspects of the present disclosure. For example, FIG. 1B illustrates that an entity can take the form of a functional entity, such as one or more routers 121 or one or more switches 122. As also illustrated in FIG. 1B, an entity could take the form of an equipment entity or a network entity, and represent an aggregation of equipment (e.g., a specific type of equipment, such as a set of reconfigurable optical add-drop multiplexers or "ROADMs") or networks (e.g., subnets or sub networks). The types of entities illustrated in FIG. 1B may generally correspond to the types of entities described in connection with FIG. 1A.

Although FIG. 1A is described in terms of entities that take the form of network entities 102 (e.g., network devices, computing devices, computing services, and the like), the term "entity" may, in other examples, encompass broader concepts. For example, FIG. 1C and FIG. 1D show other types of entities or at least different classifications of entities, such as quantitative entities 160 and qualitative entities 170. Quantitative entities 160 may include users 161, services 162, power attributes 163, cooling attributes 164. Qualitative entities 170 may include other types of entities, perhaps non-physical entities. In the example of FIG. 1D, qualitative entities 170 include one or more instances of vendor support 171, contractor experiences 172, and/or contractor skillsets 173. Techniques described herein may apply to both quantitative entities 160 and qualitative entities 170 having a trust score, and a component of the trust score may be spatial in nature. Such a trust score may be defined to some extent based on the level of trust among neighboring entities in a graph, diagram, table, or other arrangement of data.

Figure 2:
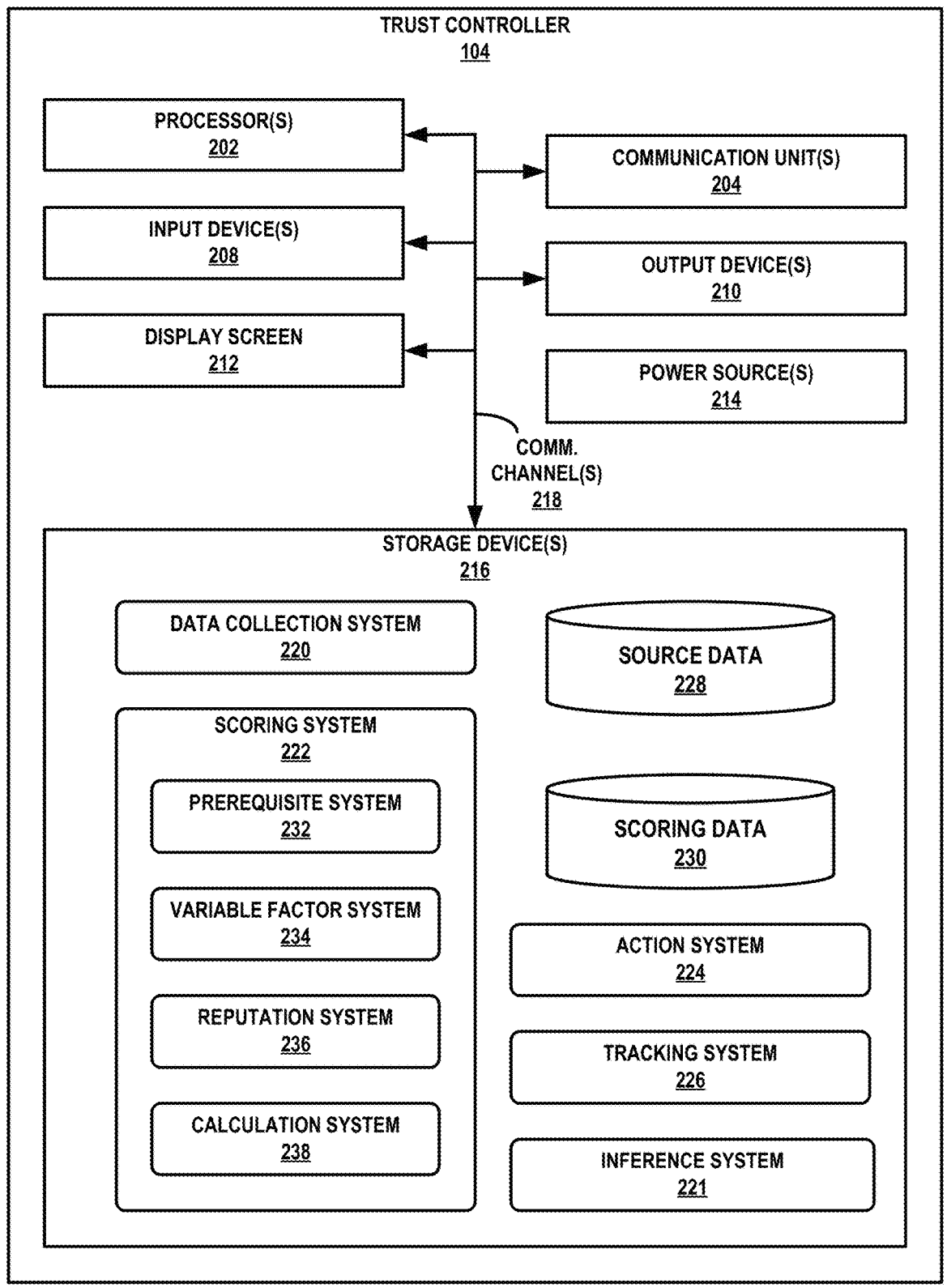
FIG. 2 is a block diagram illustrating example components of trust controller in accordance with one or more aspects of this disclosure.

FIG. 2 is a block diagram illustrating example components of trust controller 104 in accordance with one or more aspects of this disclosure. FIG. 2 illustrates one particular example of trust controller 104, and this disclosure encompasses any other appropriate configurations of trust controller 104.

As shown in the example of FIG. 2, trust controller 104 includes one or more processors 202, one or more communication units 204, one or more input devices 208, one or more output devices 210, zero or more display screens 212, one or more power sources 214, one or more storage devices 216, and one or more communication channels 218. Trust controller 104 may include other components. For example, trust controller 104 may include physical buttons, microphones, speakers, communication ports, and so on. Communication channel(s) 218 may interconnect each of components 202, 204, 208, 210, 212, and 216 for inter-component communications (physically, communicatively, and/or operatively). In some examples, communication channel(s) 218 may include a system bus, a network connection, an inter-process communication data structure, or any other method for communicating data. Power source(s) 214 may provide electrical energy to components 202, 204, 208, 210, 212 and 216.

Storage device(s) 216 may store information required for use during operation of trust controller 104. In some examples, storage device(s) 216 have the primary purpose of being a short-term and not a long-term computer-readable storage medium. Storage device(s) 216 may include volatile memory and may therefore not retain stored contents if powered off. In some examples, storage device(s) 216 includes non-volatile memory that is configured for long-term storage of information and for retaining information after power on/off cycles. In some examples, processor(s) 202 of trust controller 104 may read and execute instructions stored by storage device(s) 216.

Trust controller 104 may include one or more input devices 208 that trust controller 104 uses to receive user input. Examples of user input include tactile, audio, and video user input. Input device(s) 208 may include presence-sensitive screens, touch-sensitive screens, mice, keyboards, voice responsive systems, microphones, motion sensors capable of detecting gestures, or other types of devices for detecting input from a human or machine.

Communication unit(s) 204 may enable trust controller 104 to send data to and receive data from one or more other computing devices (e.g., via a computer network, such as a local area network or the Internet). For instance, communication unit(s) 204 may be configured to receive data from network entities 102. In some examples, communication unit(s) 204 may include wireless transmitters and receivers that enable trust controller 104 to communicate wirelessly with the other computing devices. Examples of communication unit(s) 204 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Additionally, trust controller 104 may use communication unit(s) 204 to communicate with one or more other devices.

Output device(s) 210 may generate output. Examples of output include tactile, audio, and video output. Output device(s) 210 may include presence-sensitive screens, sound cards, video graphics adapter cards, speakers, liquid crystal displays (LCD), light emitting diode (LED) displays, or other types of devices for generating output. Output device(s) 210 may include display screen 212. In some examples, output device(s) 210 may include virtual reality, augmented reality, or mixed reality display devices.

Processor(s) 202 may include processing circuitry configured to perform various actions. Processor(s) 202 may be configured to read instructions from storage device(s) 216 and may execute instructions stored by storage device(s) 216. Execution of the instructions by processor(s) 202 may configure or cause trust controller 104 to provide at least some of the functionality ascribed in this disclosure to trust controller 104 or components thereof (e.g., processor(s) 202). As shown in the example of FIG. 2, storage device(s) 216 include computer-readable instructions associated with a data collection system 220, a scoring system 222, an action system 224, and a tracking system 226. In the example of FIG. 2, storage device(s) 216 may also include source data 228 and scoring data 230. Furthermore, as shown in the example of FIG. 2, the computer-readable instructions associated with scoring system 222 may include computer-readable instructions associated with a prerequisite system 232, a variable factor system 234, a reputation system 236, and a calculation system 238. In other examples, storage device(s) 216 may include computer-readable instructions associated with other systems or modules.

Data collection system 220 is configured to collect data regarding network entities 102. For example, data collection system 220 may query log data of network entities as part of collecting the data regarding network entities 102. In some examples, data collection system 220 may be configured to collect configuration and performance data regarding the network entities. The configuration and performance data may include snapshots of configuration data, snapshots of alarm data, and logs. Data collection system 220 may also collect information about network topology, enabling a determination of which network entities 102 are neighbors (i.e., are adjacent to each other in a network topology), and also enabling collection and storage of other information about the network (e.g., network paths and routes through the network). Source data 228 may include the data collected by data collection system 220.

Scoring system 222 may use source data 228 to determine trust scores for network entities 102. Scoring data 230 may include the trust scores determined by scoring system 222 for network entities 102. In the example of FIG. 2, prerequisite system 232 may determine prerequisite sub-scores for network entities 102. Variable factor system 234 may determine variable factor sub-scores for network entities 102. Reputation system 236 may determine reputation sub-scores for network entities 102. Calculation system 238 may use one or more of the prerequisite sub-score for a network entity, a variable factor sub-score for the network entity, or the reputation sub-score for the network entity to determine the trust score for the network entity.

Prerequisite system 232 may determine prerequisite sub-scores for network entities 102. That is, prerequisite system 232 may determine the trust score for a network entity based one or more prerequisites. Each of the prerequisites is a condition that must be satisfied for the trust score for a network entity not to have the minimum value. Prerequisite system 232 may evaluate the conditions to determine the prerequisite sub-score for a network entity. Prerequisite system 232 may store the prerequisite sub-scores for network entities 102 as scoring data 230. Example conditions may include whether the network entity is using a certified software release, whether the network entity is using a certified hardware release, and so on. Other prerequisites may include the network entity not using software versions that are known to be vulnerable, the network entity using only supported software or hardware versions, the network entity having the correct network time settings, the network entity having correct certificates for transport layer security (TLS) loaded, and so on. The conditions may be user-defined.

Furthermore, variable factor system 234 may determine variable factor sub-scores for network entities 102. Each of the one or more variable factors for a network entity corresponds to a current characteristic of the network entity. Variable factor system 234 may store the variable factor sub-scores for network entities 102 as scoring data 230. The characteristics may be user-defined. Examples of characteristics may include:

Use of only approved applications on the network entity.
    Use of only signed applications on the network entity.
    Whether a release version of the network entity is a known-good version.
    A state or configuration of a network entity, e.g., if a recommended configuration is applied or not.

Whether a software release version of a software application of the network entity is within a given number of releases of a current version of the software application.

Rate limits for requests to be processed by a routing engine of a router.

Limits on rates of possible network management interactions per time period.

Password strength requirements.

Numbers and types of open network ports,

Whether cryptographic keys are renewed more frequently than a threshold time limit.

Variable factor system 234 may apply different weights to different characteristics to determine the variable factor sub-score for a network entity. Thus, specific characteristics may make greater contributions to the variable factor sub-score than other characteristics. Table 1, below, illustrates example contributions of specific choices (possible values) for specific characteristics of a network entity. As shown in the example of Table 1, software applications (apps) may be categorized into a plurality of classes (e.g., Class 1, Class 2, Class 3, etc.). The different classes of apps may correspond to different levels of risk. For instance, Class 1 apps may be limited to apps approved by a system vendor, signed applications, applications with security audits, etc., Class 2 apps may be limited to apps approved by a supplier, unsigned applications, applications with regular security updates, etc., Class 3 apps may be unapproved apps, and so on. In Table 1, the contribution column indicates a score that would be contributed if the corresponding choice in the "choices" column applies. In other examples, one or more choices may be associated with negative values, but the final variable factor sub-score may be limited to a minimum of 0 or other predefined minimum value. In Table 1, the "Sample Score" column provides an example of how a variable factor sub-score may be calculated for a specific network entity. Thus, in the example of Table 1, if the network entity used only Class 1 apps and has a software version that is within 3 releases of the most recent release of the software, but the software is not a known-good release, variable factor system 234 may determine the variable factor sub-score as 60 (i.e., 50+10).

TABLE 1

| | Characteristics | Contribution | Choices | Sample Score |
|---|---|---|---|---|
| Contributions within variable trust | Software (max 50%) | 50 | Class 1 apps only | 50 |
| | | 20 | Class 1 and Class 2 apps only | |
| | | 10 | Class 1, Class 2 and Class 3 apps | |
| | Is a known-good release | 40 | Yes | |
| | | 0 | No | 0 |
| | Software version <= last-3 | 10 | Yes | 10 |
| | | 0 | No | |
| | Total | | | 60 |

Reputation system 236 may determine reputation sub-scores for network entities 102. The reputation sub-score for a network entity may be based on one or more reputational factors for the network entity. Each of the reputational factors for the network entity is a function of specified historical events involving the network entity. The reputational factors for a network entity may be user-defined. The historical events may be defined to be those events that occur within a specific time period (e.g., 5 weeks, 10 weeks, 6 months, etc.). Reputation system 236 may store the reputation sub-scores for network entities 102 as scoring data 230. Example types of reputation factors may include:

A number of temporal intervals (e.g., weeks, days, etc.) without a reset of the network entity.

A number of temporal intervals (e.g., weeks, days, etc.) without a reboot of the network entity.

A number of failed log-ins.

Log-in frequency.

Configuration frequency.

A number of protocol timeouts or other runtime data

Table 2, below, illustrates an example of how reputation system 236 may determine the reputation sub-score for a network entity. For instance, in Table 2, reputation system 236 may increase a reputation sub-score for the network entity by 5 for each month in which the network entity did not experience a reset. Furthermore, in Table 2, reputation system 236 may increase the reputation sub-score for the network entity by 15 for each month in which the network entity did not experience a reboot. Because the considered time period is 5 months, the maximum reputation sub-score, in this example, is 100.

TABLE 2

| | Factor | Choices | Contribution |
|---|---|---|---|
| Relative weights for items within reputation | Reputation per period without reset | | 5 |
| | Reputation per period without reboot | | 15 |
| | Interval | Month | |
| | Length of history considered | 5 | |
| | Maximum | | 100 |

Calculation system 238 may use one or more of a prerequisite sub-score for a network entity, a variable factor sub-score for the network entity, or a reputation sub-score for the network entity to determine the trust score for the network entity. When calculating a trust score for a network entity, calculation system 238 may determine that the trust score for the network entity indicates no trust if one or more of the prerequisite conditions are not satisfied (e.g., if the prerequisite sub-score has the minimum value (e.g., 0)). In some examples, calculation system 238 determines the trust score for a network entity as a sum of the variable factor sub-score and the reputation sub-score. In some examples, calculation system 238 determines the trust score for a network entity as a weighted sum of the variable factor sub-score and the reputation sub-score. For instance, calculation system 238 may apply a 60% weight to the variable factor sub-score and a 40% weight to the reputation sub-score. In some examples, the weights applied to the variable factor sub-score and the reputation sub-score are user-defined. Thus, because the weights applied to the variable factor sub-score and reputation sub-score are user-defined, the ultimate trust score may be dependent on a user's priorities and preferences. In some examples, calculation system 238 may multiply the resulting sum (or weighted sum) by the prerequisite sub-score to determine the trust score for the network entity. In some examples, rather than trust controller 104 calculating a prerequisite sub-score, calculation system 238 may simply set the trust score for a network entity to the minimum value (e.g., 0) if any of the prerequisite conditions are not satisfied. Calculation system 238 may store the trust scores for network entities 102 into scoring data 230.

In some examples, scoring system 222 may aggregate the trust scores for two or more of network entities 102 to determine a trust score for a higher-order network entity. Example types of higher-order network entities may include networks, services, routes, and/or other collections of one or more network entities. Scoring system 222 may aggregate the trust scores in one of a variety of ways. For example, scoring system 222 may aggregate the trust scores for two or more of network entities 102 to determine a trust score for a higher-order network entity by taking a lowest trust score of the two or more network entities as the trust score for the higher-order network entity. In another example, scoring system 222 may aggregate the trust scores for two or more of network entities 102 to determine a trust score for a higher-order network entity as an average or sum of the trust scores for the two or more network entities.

Action system 224 may perform one or more actions based on the trust scores determined for network entities 102 by scoring system 222. For example, action system 224 may modify a traffic pattern of computer network 100 based on the trust score for the network entity. For instance, in this example, based on the trust score for the network entity, action system 224 may change the traffic pattern in computer network 100 to divert network traffic away from or direct the network traffic to the network entity. For instance, if the trust score for a network entity is below a specific threshold, action system 224 may change the traffic pattern in computer network 100 to divert network traffic away from the network entity. In some examples, if the trust score for a network entity is above a specific threshold, action system 224 may change the traffic pattern in computer network 100 to direct network traffic to the network entity. In another example, based on a trust score of a network entity being greater than a particular threshold, action system 224 may send instructions to one or more routers in computer network 100 that cause the routers to change routes in computer network 100 so that packets are not directed along routes that lead to or through the network entity.

In another example, action system 224 may determine that there is a conflict information between two sensors (e.g., in the context of an airplane, an angle of attack sensor and a nose pitch sensor). In this example, action system 224 may perform one or actions based on the trust scores for the sensors (i.e., network entities) in response to determining such a conflict. For instance, action system 224 may generate a notice to an operator recommending use of information from the sensor with a greater trust score. In another example, action system 224 may disable the sensor with the lower trust score. In some examples, action system 224 may recommend a probe or obtain a combination of other sensor data to determine which of the two sensors is more likely to be generating accurate data. In an example where the network entities include multiple clock sources (e.g., Precision Time Protocol (PTP) clock sources), action system 224 may change a master clock source from a current clock source to a back-up clock source due to the back-up clock source having a greater trust score than the current clock source. In some examples, action system 224 may identify routes through network 100 based on trust scores for network entities in network 100. Thus, action system 224 may configure routers to route network traffic along routes that pass through network entities having high trust scores.

Tracking system 226 may track changes in trust scores and/or sub-scores and reevaluate the level of trust associated with one or more entities. Tracking system 226 may collect information from source data 228 and determine changes in trust scores and/or sub-scores associated with one or more network entities 102. Tracking system 226 may determine, based on historical information about trust scores for each of network entities 102, which of network entities 102 need service, such as an upgrade, audit, review, test, or other evaluation. In some examples, tracking system 226 may identify one or more network entities 102 having consistently high trust scores and implement a tendency to use such network entities 102 for high priority, high importance, or mission-critical tasks.

Inference system 221 may perform functions relating to inferring trust scores for a given entity based on a distance, separation, or locality that entity from the perspective of another entity. Inference system 221 may apply this inferred trust as a component of trust or as a degree of trust. In some examples, inference system 221 may be used to adjust (and thereby improve) trust scores determined by scoring system 222. In such an example, inference system 221 may apply an adjustment to a trust score for an entity that is based on a degree of separation between an entity and another entity whose trust is being assessed, where the degree of separation corresponds to a distance, a count of intervening entities, or a locality associated with the entity being assessed.

For example, in FIG. 1A, if network entity 102E has a trust score of 70, network entity 102C, which is adjacent to network entity, may view network entity as having a trust score of 70. If network entity 102C has trust score 80, then network entity 102A, which is adjacent to network entity 102C, may view network entity as having a trust score of 80. However, the trust score that network entity 102A associates with network entity 102E may be a function of the trust scores for network entity 102C, network entity 102E, and the number of intervening network entities between network entity 102A and 102E:

trust score of 102A=f(trust score of 102C, trust score of 102E, count intervening entities between 102A and 102E)

Where the count of intervening entities is high, the trust score may be reduced. Where the count is low, the trust score may be higher.

In other examples, inference system 221 may be integrated into scoring system 222 so that calculation system 238 calculates a trust score by taking into account inferences about trust amongst network entities 102.

In an example where inference system 221 or aspects of inference system 221 are integrated into scoring system 222, both variable factor system 234 and reputation system 236 may use trust inferences or information derived from trust inferences in order to make variable and reputational assessments, respectfully. Variable factor system 234 may recalculate trust scores, for example, as new entities get added and new trust inferences are determined. Reputation system 236 may assess whether trust inferences between entities improve or deteriorate over time. In such an example, Tables 1 and 2, described above, might be modified as follows:

TABLE 1'

| | Characteristics | Contribution | Choices | Sample Score |
|---|---|---|---|---|
| Contributions within variable trust | Software (max 50%) | 50 | Class 1 apps only | 50 |
| | | 20 | Class 1 and Class 2 apps only | |
| | | 10 | Class 1, Class 2 and Class 3 apps | |
| | Is a known-good release Software | 40 | Yes | |
| | | 0 | No | 0 |
| | | 10 | Yes | 10 |

TABLE 1'-continued

| Characteristics | Contribution | Choices | Sample Score |
|---|---|---|---|
| version <= last-3 | 0 | No | |
| Change in degree of separation | 0-N | Range | 1 |
| Total | | | 61 |

TABLE 2'

| | Factor | Choices | Contribution |
|---|---|---|---|
| Relative weights for items within reputation | Reputation per period without reset | | 5 |
| | Reputation per period without reboot | | 15 |
| | Interval | Month | |
| | Length of history considered | 5 | |
| | Change in neighbor score | 3 | 4 |
| | Maximum | | 100 |

Scoring system 222 may use trust inferences or information derived from such trust inferences to supplement existing metrics, thereby improving accuracy of scoring system 222. In general, inference system 221 may receive information from and output information to one or more other systems or modules within storage devices 216, and may otherwise interact with and/or operate in conjunction with one or more other systems and/or modules of trust controller 104.

Various systems illustrated in FIG. 2 (e.g., data collection system 220, inference system 221, scoring system 222, action system 224, tracking system 226, prerequisite system 232, variable factor system 234, reputation system 236, calculation system 238) may be implemented as modules or other logic. In such an example, such modules illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
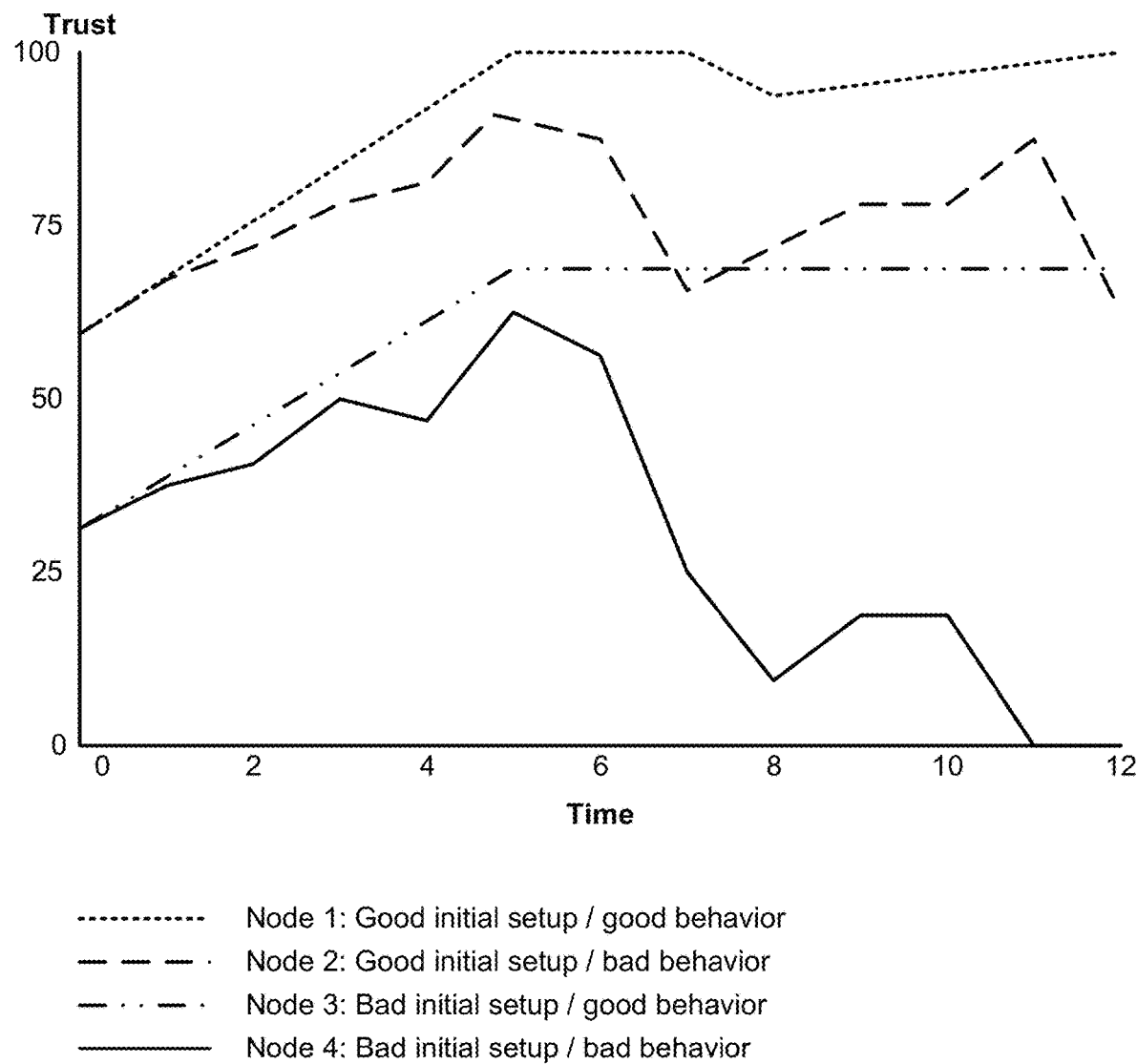
FIG. 3 is a chart illustrating that trust scores can change over time, in accordance with one or more aspects of this disclosure.

FIG. 3 is a chart illustrating that trust scores can change over time, in accordance with one or more aspects of this disclosure. In some examples, tracking system 226 of trust controller 104 may track changes in trust scores and/or sub-scores and reevaluate the level of trust associated with one or more entities. Trust controller 104 may use information regarding changes in trust scores and/or sub-scores for various purposes. For example, trust controller 104 may use historical information regarding trust scores for network entities to determine which network entities need attention (e.g., need to be upgraded, audited, reviewed, tested, etc.). In other examples, trust controller 104 may use such historical information to identify network entities having consistently high trust scores and configure network 100 to utilize the identified network entities for high-priority tasks, such as for urgent communications during emergencies).

In the example of FIG. 3, a "good initial setup" might mean that all pre-requisites are met and the variable and reputational factor result in a "good" initial score. "Behavior" may represent actions that change the trust score over time. Where trust or a trust score does not deteriorate or decrease, behavior may be considered "good." Where a trust score does deteriorate, behavior might be considered "bad."

Figure 4A:
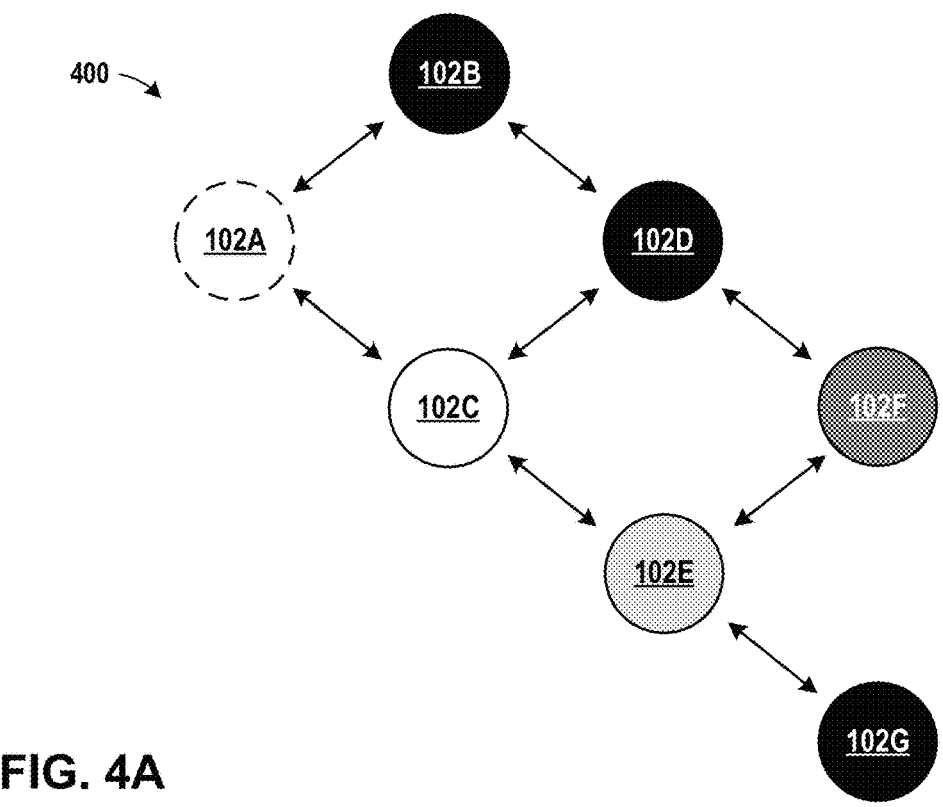
FIG. 4A is a conceptual diagram illustrating how trust might be inferred based on attributes of entities that separate one entity from another entity, in accordance with one or more aspects of this disclosure.

FIG. 4A is a conceptual diagram illustrating how trust might be inferred based on attributes of entities that separate one entity from another entity, in accordance with one or more aspects of this disclosure. In FIG. 4A, network 400 includes network entities 102 that generally correspond to those of FIG. 1A. Bidirectional connections are illustrated between neighboring or connected entities. In FIG. 4A, network entity 102A and network entity 102C are neighboring entities, or are adjacent to each other, since network entity can, for example, send data directly to the other network entity without first sending network data through another network entity. Network entity 102A is "separated" from network entity 102E, however, since data transferred from network entity 102A to network entity 102E would traverse at least one other network entity (e.g., network entity 102C). Network entity 102A and network entity 102E might be considered to be separated by one other network entity, since the shortest path between the two network entities involves one other network entity. Attributes of the separation ("attributes of separation") between two network entities might include the number of other network entities the separate the network entities (e.g., a "degree of separation" or a "count of entities," which would have a value of one for network entities 102A and 102E), the type of entities that separate the network entities, information about the path between the network entities, or other information.

Also in FIG. 4A, network entities 102 are illustrated with varying degrees of shading, where the shading indicates a level of trust from the perspective of network entity 102A (note that 102A is drawn with a dotted line). Network entities 102 that are shaded are considered untrusted from the perspective of network entity 102A; network entities 102 having little or no shading are considered trusted from the perspective of network entity 102A. In some examples, a binary trust relationship might apply such that neighbors might be classified simply as either trusted or untrusted. However, in at least some illustrations shown herein (including FIG. 4A), a continuum of trust may apply, such that network entities 102 that are more darkly shaded than other network entities 102 are considered less trusted.

Trust controller 104 may determine a trust score for one or more network entities 102 within network 400. For instance, trust controller 104 may calculate a trust score for one or more of network entities 102A through 102G by applying scoring system 222 to attributes of each of network entities 102 in the manner describe above in connection with FIG. 2. In another example, however, trust controller 104 may use an alternative method for determining trust scores.

In an example where trust controller 104 applies scoring system 222 as described in connection with FIG. 2, trust controller 104 may apply prerequisite system 232, variable factor system 234, reputation system 236, and calculation system 238 to arrive at trust scores for at least some of network entities 102. For instance, in FIG. 4A and with reference to trust controller 104 of FIG. 2, prerequisite system 232 of trust controller 104 assesses prerequisites for each of network entities 102A through 102G. Prerequisite system 232 identifies which of network entities 102 satisfy and do not satisfy required prerequisites. Those network entities 102 that do not satisfy the prerequisites are marked as untrusted.

For those network entities 102 that do satisfy the prerequisites, variable factor system 234 of trust controller 104 determines variable factor sub-scores for each such network entity 102. For instance, as described in connection with FIG. 2, variable factor system 234 may apply appropriate weights to different characteristics to determine the variable factor sub-score for each of network entities 102 (or at least for those network entities 102 that satisfied the prerequisites). Variable factor system 234 stores the variable factor sub-scores for network entities 102 as scoring data 230.

Also for those network entities 102 that do satisfy the prerequisites, reputation system 236 of trust controller 104 determines reputation sub-scores for each of such network entities 102. For instance, also as described in connection with FIG. 2, reputation system 236 may apply weights to various factors, attributes, or characteristics of each network entity 102 to assess a reputational sub-score. Reputation system 236 may also evaluate historical data within a specific time period. Reputation system 236 calculates a reputational sub-score for each of network entities 102 (or at least for network entities 102 meeting the prerequisites). Reputation system 236 stores the reputational sub-scores for network entities 102 as scoring data 230.

Calculation system 238 may use the variable factor sub-scores and the reputational sub-scores to calculate a trust score. For instance, again referring to FIG. 2 and FIG. 4A, calculation system 238 accesses scoring data 230, which includes the sub-scores stored by variable factor system 234 and reputation system 236. Calculation system 238 uses the accessed sub-scores to determine a trust score for each of network entities 102. In one example, calculation system 238 sums the sub-scores to arrive at a trust score. In some examples, calculation system 238 may multiply the resulting sum (or weighted sum) by the prerequisite sub-score to determine respective trust scores for each of network entities 102. Calculation system 238 stores the trust scores for each of network entities 102 as scoring data 230. Such scores might be calculated for just those network entities 102 that satisfied the prerequisites evaluated by prerequisite system 232. In situations where prerequisite system 232 determined that one or more of network entities 102 did not satisfy one or more prerequisites, calculation system 238 may determine that for any such network entity 102 that did not satisfy a prerequisite, the trust score is zero.

Trust controller 104 may also determine information about the degree of trust between neighbors or connected entities in FIG. 4A. For instance, in an example that can be described with reference to FIG. 4A, trust controller 104 (see FIG. 1A) determines a set of trust inferences for each of network entity 102A through 102G, where such trust inferences indicate, from the perspective of a specific network entity 102, a degree of trust between that specific network entity 102 and other network entities 102. FIG. 4A shows the trust inferences from the perspective of network entity 102A, and network entity 102A is drawn with a dotted line to indicate that the trust inferences shown in FIG. 4A are from the perspective of network entity 102A. As described above, the other network entities 102 that are unshaded are considered trusted from the perspective of network entity 102A. Network entities 102 that are shaded are considered untrusted from the perspective of network entity 102A.

In the example shown in FIG. 4A, trust controller 104 may use trust calculations for each of network entities 102 to determine a degree to which network entity 102A can trust other network entities 102. For instance, in FIG. 4A, trust controller 104 determines whether network entity 102A can trust another entity by assessing whether such other entities are trusted by an entity that is already trusted by network entity 102A. For example, in FIG. 4A, network entity 102A trusts network entity 102C (network entity 102C is shown unshaded, or trusted from the perspective of network entity 102A), but network entity 102A does not trust network entity 102B (network entity 102B is shown shaded, indicating a lack of trust from the perspective of network entity 102A). Further, based on an analysis performed by trust controller 104, trust controller 104 has determined that network entity 102C trusts network entity 102E, but network entity 102C does not trust network entity 102D. Further, trust controller 104 has determined that network entity 102E trusts network entity 102F, but does not trust network entity 102G.

Using such information, trust controller 104 determines that from the perspective of network entity 102A, network entity 102E has some positive degree of trust (i.e., is trusted to some degree by network entity 102A). Specifically, inference system 221 of trust controller 104 (see FIG. 2) accesses information about network topology within source data 228 and determines that network entity 102C is adjacent to (i.e., is a neighbor to) network entity 102A. Inference system 221 also determines, based on the topology, that network entity 102E is not adjacent to (not a "neighbor" of) network entity 102A, but that network entity 102E is adjacent to network entity 102C.

Inference system 221 uses such information to determine that from the perspective of network entity 102A, network entity 102E is trusted because network entity 102C trusts neighboring network entity 102E, and network entity 102A trusts network entity 102C, which is a neighbor to network entity 102A. Based on these attributes, trust controller 104 determines that network entity 102E is trusted by network entity 102A. And while inference system 221 may determine that from the perspective of 102A, network entity 102E is trusted, inference system 221 might also determine that network entity 102E is not trusted by network entity 102A as much as network entity 102C is trusted by network entity 102A. Inference system 221 may make such a determination at least because network entity 102E is more distant from network entity 102A (i.e., network entity 102E has a higher degree of separation—e.g., a higher count of intervening devices or entities—from network entity 102A than network entity 102C has from network entity 102A).

Trust controller 104 may also determine that from the perspective of network entity 102A, network entity 102F is also trusted, or at least has some positive degree of trust. Inference system 221 of trust controller 104 makes this determination (i.e., that network entity 102F can be trusted by network entity 102A) based on the network topology and based on information indicating that network entity 102E trusts network entity 102F and network entity 102A trusts network entity 102E. However, based on the additional degree of separation between network entity 102F relative to network entity 102E, network entity 102A may trust network entity 102F less than it trusts network entity 102E.

Trust controller 104 may also identify one or more network entities 102 that, from the perspective of network entity 102A, are not trusted. For example, inference system 221 of trust controller 104 may determine that from the perspective of network entity 102A, network entity 102D is not trusted because, as described above, network entity 102D is not trusted by network entity 102C. Similarly, inference system 221 may determine that from the perspective of network entity 102A, network entity 102G is not trusted because, also as described above, network entity 102G is not trusted by network entity 102E.

Trust controller 104 may enable, based on the level of trust that the network entity 102A has for network entity 102E, network entity 102A to perform an operation with network entity 102E. For instance, in the example of FIG. 4A and with reference to FIG. 2, action system 224 may determine that network entity 102A trusts network entity 102E, so action system 224 may place network entity 102E on an access control list or the trust may be used to influence a decision about whether to place one or more network entities on an access control list.

In another example, action system 224 may, if network entity 102A trusts network entity 102E, route traffic along a path that includes network entity 102E. However, in an example in which action system 224 determines that network entity 102A does not trust network entity 102E, action center may choose to route traffic along a path that does not include network entity 102E. In some examples, action system 224 may actively prevent traffic from flowing through network entity 102E by identifying network traffic that is queued to traverse network entity 102E and adjusting network flows so that at least some of the network traffic does not traverse network entity 102E.

Where the level of trust represents a continuum of values (e.g., trust "scores," where higher values representing more trust that lower values), action system 224 may determine that network 102A trusts network entity 102E if the level of trust between network 102A and network entity 102E exceeds a threshold value, in which case action system 224 may enable network entity 102A to perform one or more operations with network entity 102E. Where the level of trust does not exceed the threshold value, action system 224 might not enable network entity 102A to perform one or more operations with network entity 102E.

In the example of FIG. 4A, trust controller 104 is described as assessing trust relationships, assigning trust scores, and performing operations to infer trust. In other examples, however, such operations may be performed by one or more of network entities 102 individually, such that trust scores and/or trust relationships are assessed in a distributed manner. In such an example, information about trust scores and/or trust relationships can be stored locally, in each of network entities 102. In other examples, such information may be assessed in a distributed manner, but still stored in a single location that each of network entities 102 can access. For entities that contain processors, or entities and that have sufficient computing capability to make assessments about trust based on data that it collects or that another entity or computing device collects, information about trust scores and/or trust relationships may be calculated or determined by individual network entities 102, rather than by trust controller 104. In such an example, a data sharing mechanism may be in place to enable sharing of data, even between entities that do not trust each other. Trust inference data can be exposed through an application programming interface or can be shared between entities and/or computing systems using a protocol.

Figure 4B:
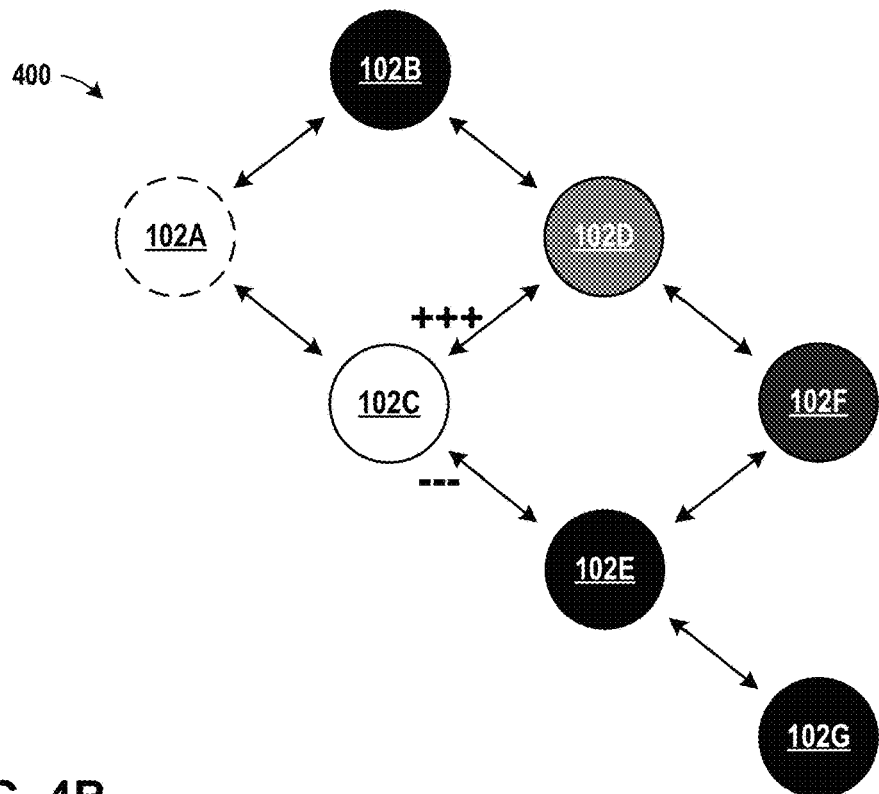
FIG. 4B is a conceptual diagram illustrating how a change in the level of trust between entities might affect a degree of trust between other entities, in accordance with one or more aspects of this disclosure.

FIG. 4B is a conceptual diagram illustrating how a change in the level of trust between entities might affect a degree of trust between other entities in the diagram of FIG. 4A, in accordance with one or more aspects of this disclosure. FIG. 4B illustrates the same network 400 as shown in FIG. 4A, except that in FIG. 4B, the level of trust between network entity 102C and network entity 102D has changed, as has the level of trust between network entity 102C and network entity 102E. Specifically, the degree of trust between network entity 102C and network entity 102D has increased so that network entity 102C now trusts network entity 102D to some extent (previously, in FIG. 4A, network entity 102C did not trust network entity 102D). The increase in trust is indicated by the "+++" shown in FIG. 4B. Also in FIG. 4B, the degree of trust between network entity 102C and network entity 102E has decreased, so that network entity 102C now trusts network entity 102E less than it did in FIG. 4A (see the "- - -" notation in FIG. 4B).

Trust controller 104 may determine the extent to which a change in trust might affect one or more trust inferences for network entity 102A. For instance, with reference to FIG. 4B and FIG. 2, router 121 of trust controller 104 detects input from tracking system 226. Inference system 221 determines that the input corresponds to information about a change in trust among network entities 102. For example, inference system 221 determines that network entity 102C has updated its software to a version that is more recent and/or is more reliable. Inference system 221 may also, for example, determine that network entity 102E required one or more additional reboot operations to address issues with performance of network entity 102E. Accordingly, inference system 221 determines, based on this information, that the degree to which network entity 102C trusts network entity 102D has increased, and the degree to which network entity 102C trusts network entity 102E has decreased. Where the level of trust is expressed in terms of a trust score, inference system may increase the score associated with the trust that network entity 102C has for network entity 102D, but decrease the score associated with the trust network entity 102C has for network entity 102E. Where the level of trust is expressed in terms of a category, inference system 221 may thereafter classify network entity 102D with a more highly-trusted category, and may thereafter classify network entity 102E with a less-trusted category.

Inference system 221 determines that the change in trust among network entities 102 affects the set of trust inferences for network entity 102A with respect to various network entities 102, even though the degree of separation (e.g., the number of network entities) between network entity 102A and other network entities 102 has not changed. As described, inference system 221 modifies the trust inferences for network entity 102A so that network entity 102A now trusts network entity 102D to some extent (whereas before, network entity 102A did not trust network entity 102D). To reflect this change, network entity 102D is now shaded less darkly in FIG. 4B than in FIG. 4A. Also, inference system 221 modifies the trust inferences so that network entity 102A now trusts network entity 102E less than it did prior to detecting the change in trust among network entities 102 (note the increased shading in network entity 102E in FIG. 4B).

In some examples, inference system 221 may also determine that the changes in trust between network entity 102C and network entity 102D and network entity 102E may affect the trust network entity 102A has in network entity 102F. Note, for example, both network entity 102D and network entity 102E are on a path from network entity 102A to network entity 102F. In such an example, the level of trust network entity 102A has in network entity 102F may decrease, as illustrated in FIG. 4B.

Figure 5A:
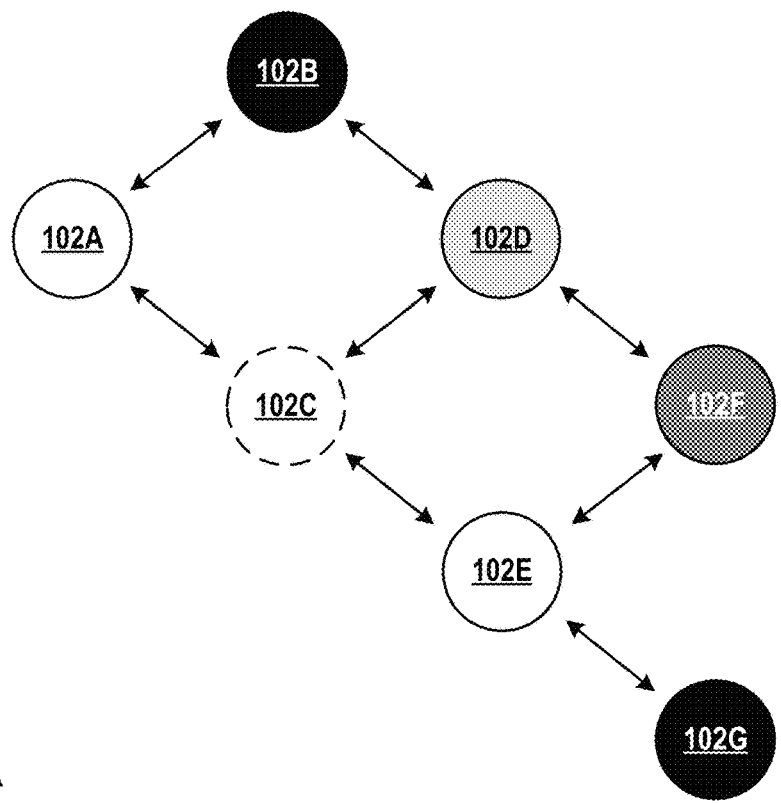
FIG. 5A and FIG. 5B are conceptual diagrams illustrating trust inferences for two different entities, in accordance with one or more aspects of the present disclosure.
Figure 5B:
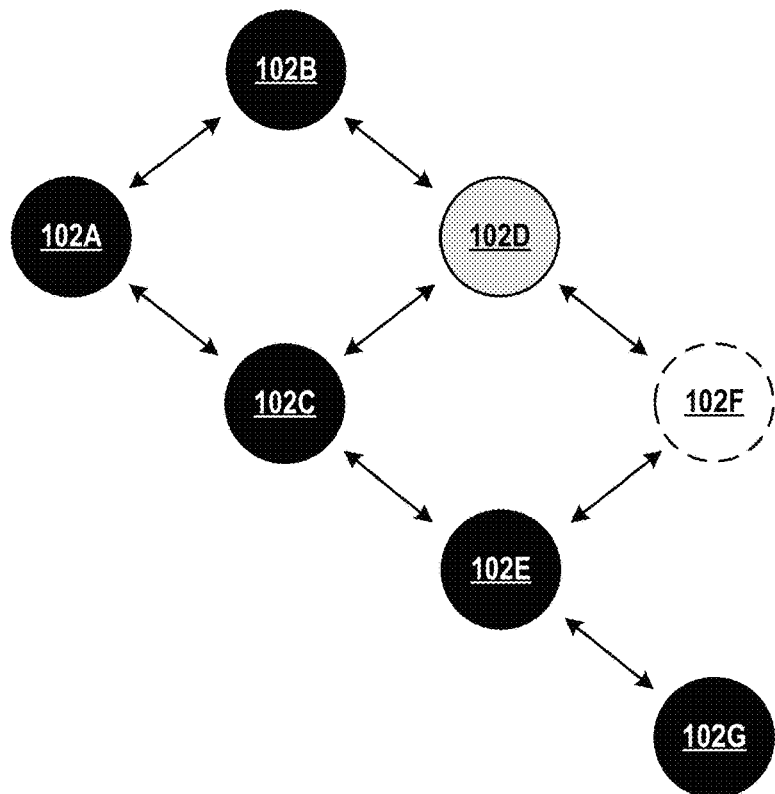

FIG. 5A and FIG. 5B are conceptual diagrams illustrating trust inferences for two different entities, in accordance with one or more aspects of the present disclosure. FIG. 5A illustrates a set of trust inferences from the perspective of network entity 102C (note that network entity 102C is shown with a dotted line in FIG. 5A). FIG. 5B illustrates a set of trust inferences from the perspective of network entity 102F (note that network entity 102F is shown with a dotted line in FIG. 5B).

In FIG. 5A, and as illustrated by the shading of network entities 102 in the diagram, network entity 102C trusts network entity 102A and network entity 102E, and has some lesser level of trust for network entity 102D and network entity 102F. Network entity 102C does not, however, trust network entity 102B or network entity 102G.

In FIG. 5B, and as illustrated by the shading of network entities 102 in diagram of FIG. 5B, network entity 102F has some level of trust for network entity 102D, but does not trust any of the other network entities 102. Taken together, FIG. 5A and FIG. 5B illustrate that network entity 102C does trust network entity 102F to some extent, but that network entity 102F does not trust network entity 102C. Accordingly, this highlights that degrees of trust between entities are, at least in some examples, not reciprocal. In such examples, degrees of trust should not be assumed to be reciprocal.

Figure 6:
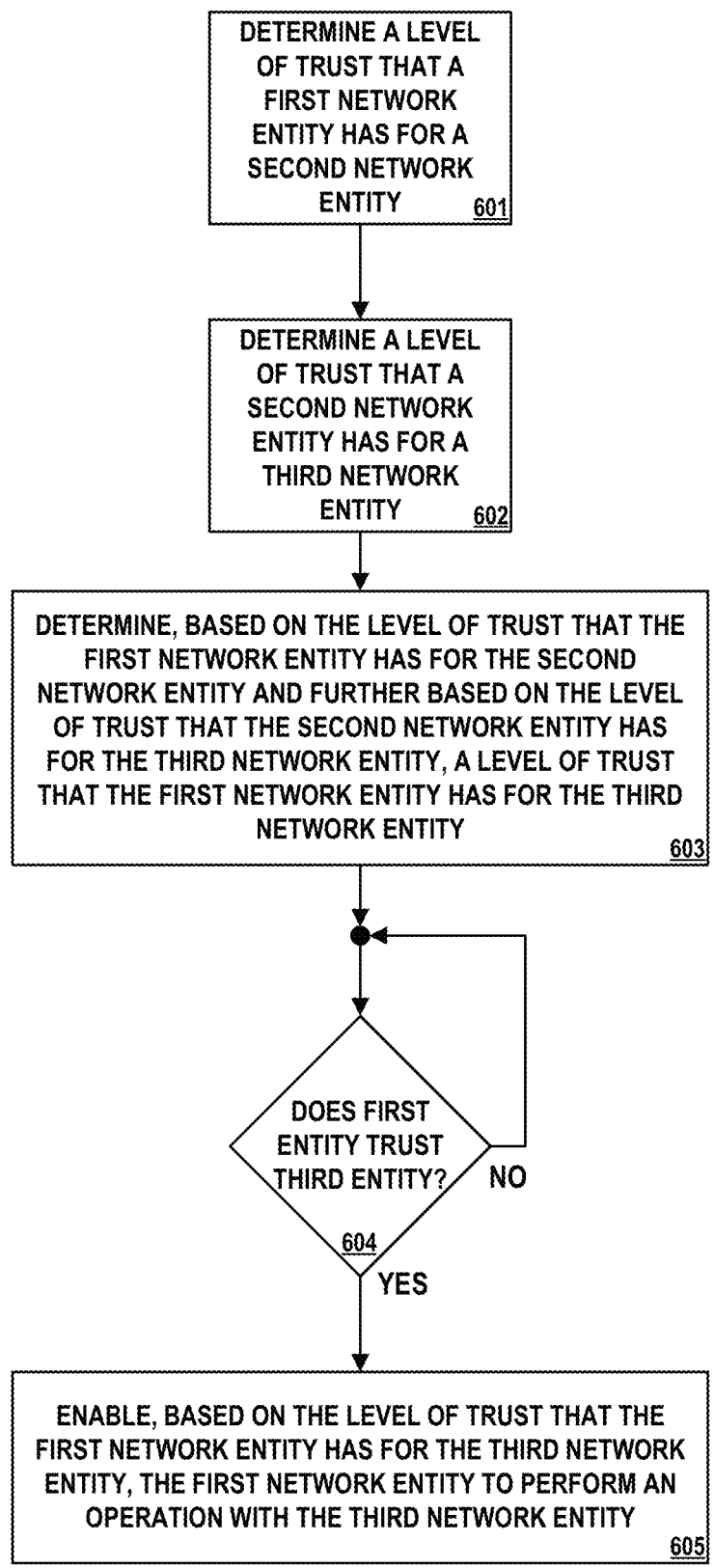
FIG. 6 is a flow diagram illustrating operations performed by an example trust controller in accordance with one or more aspects of the present disclosure.

FIG. 6 is a flow diagram illustrating operations performed by an example trust controller 104 in accordance with one or more aspects of the present disclosure. FIG. 6 is described below within the context of network 100 and trust controller 104 of FIG. 1A. In other examples, operations described in FIG. 6 may be performed by one or more other components, modules, systems, or devices. Further, in other examples, operations described in connection with FIG. 6 may be merged, performed in a difference sequence, omitted, or may encompass additional operations not specifically illustrated or described.

In the process illustrated in FIG. 6, and in accordance with one or more aspects of the present disclosure, trust controller 104 may determine a level of trust that a first network entity has for a second network entity (601). For example, in FIG. 1A, trust controller 104 may determine to what extent network entity 102A (a first entity) trusts network entity 102C (a second entity). Trust controller 104 may make such a determination by applying a prerequisite scoring system, a variable factor scoring system, and/or a reputation scoring system to arrive at trust score for network entity 102C.

Trust controller 104 may determine a level of trust that a second network entity has for a third network entity (602). For example, in FIG. 1A, trust controller 104 may determine to what extent network entity 102C (the second entity) trusts network entity 102E (a third entity). Trust controller 104 may make such a determination by again applying a prerequisite scoring system, a variable factor scoring system, and/or a reputation scoring system, this time to arrive at trust score for network entity 102E.

Trust controller 104 may determine, based on the level of trust that the first network entity has for the second network entity and further based on the level of trust that the second network entity has for the third network entity, a level of trust that the first network entity has for the third network entity (603). For example, trust controller 104 may determine that network entity 102A (the first entity) does not directly interact with or connect to network entity 102E (the third entity). However, trust controller 104 may determine that it can infer a trust relationship between network entity 102A and network entity 102E based on the trust relationships between entities located between network entity 102A and network entity 102E (i.e., network entity 102C in FIG. 1A separates network entity 102A from network entity 102E). Trust controller 104 infers a level of trust that network entity 102A has for network entity 102E based on at least two trust relationships: the level of trust between network entity 102A and network entity 102C, and the level of trust between network entity 102C and network entity 102E. Where network entity 102A trusts network entity 102C and network entity 102C trusts network entity 102E, trust controller 104 may infer that network entity 102A trusts network entity 102E. However, if network entity 102A does not trust network entity 102C and/or network entity 102C does not trust network entity 102E, trust controller 104 may infer that network entity 102A does not or should not trust network entity 102E.

Trust controller 104 may enable, based on the level of trust that the first network entity has for the third network entity, the first network entity to perform an operation with the third network entity (605). For example, trust controller 104 may allow network entity 102A to interact with network entity 102E (e.g., transfer data) if trust controller 104 determines that network entity 102E is trusted from the perspective of network entity 102A (YES path from 604). However, trust controller 104 might preclude network entity 102A from interacting with network entity 102E in at least some ways if trust controller 104 determines that network entity 102E should not be trusted (NO path from 604).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are each hereby incorporated by reference in their entireties. To the extent that any such disclosure material that is incorporated by reference conflicts with the instant disclosure, the instant disclosure shall control.

For ease of illustration, only a limited number of devices (e.g., network entities 102, trust controller 104, entities 110, quantitative entities 160, qualitative entities 170, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1A and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   determining, by a computing system, a level of trust that a first network device has for a second network device;
   determining, by the computing system, a level of trust that the second network device has for a third network device;
   determining, by the computing system, that the first network device is separated from the third network device by the second network device;
   determining, by the computing system and based on the level of trust that the first network device has for the second network device and further based on the level of trust that the second network device has for the third network device, a level of trust that the first network device has for the third network device;
   enabling, by the computing system and based on the level of trust that the first network device has for the third network device, the first network device to perform an operation with the third network device;
   detecting, by the computing system, a change in the level of trust that the first network device has for the second network device; and
   adjusting, by the computing system, based on the change in the level of trust that the first network device has for the second network device, the level of trust that the first network device has for the third network device.

2. The method of claim 1, wherein determining the level of trust that the first network device has for the third network device includes:
   determining, by the computing system, attributes of a separation between the first network device and the second network device.

3. The method of claim 2, wherein determining attributes of the separation between the first network device and the second network device includes:
   determining, by the computing system, a count of entities that separate the first network device from the second network device.

4. The method of claim 1, wherein a fourth network device neighbors the third network device but does not neighbor the first network device, and wherein the method further comprises:
   determining, by the computing system, a level of trust that the first network device has for the fourth network device by inferring the level of trust that the first network device has for the fourth network device.

5. The method of claim 1, further comprising:
   detecting, by the computing system, a change in the level of trust that the second network device has for the third network device; and
   further adjusting, by the computing system, based on the change in the level of trust that the second network device has for the third network device, the level of trust that the first network device has for the third network device.

6. The method of claim 1,
   wherein the first network device, the second network device, and the third network device are each network devices, and wherein each of the first network device, the second network device, and the third network device are connected through a network.

7. The method of claim 6,
   wherein the first network device is connected to the third network device on the network by a network path through the second network device.

8. The method of claim 6,
   wherein the network includes quantitative entities.

9. The method of claim 6,
   wherein the network includes qualitative entities.

10. The method of claim 1, wherein enabling the first network device to perform an operation with the third network device includes:
    enabling, by the computing system, network data to flow between the first network device and the third network device.

11. A system comprising a storage device and processing circuitry having access to the storage device, wherein the processing circuitry is configured to:
    determine a level of trust that a first network device has for a second network device;
    determine a level of trust that the second network device has for a third network device;
    determine that the first network device is separated from the third network device by the second network device;
    determine, based on the level of trust that the first network device has for the second network device and further based on the level of trust that the second network device has for the third network device, a level of trust that the first network device has for the third network device;
    enable, based on the level of trust that the first network device has for the third network device, the first network device to perform an operation with the third network device;
    detect a change in the level of trust that the first network device has for the second network device; and
    adjust, based on the change in the level of trust that the first network device has for the second network device, the level of trust that the first network device has for the third network device.

12. The system of claim 11, wherein to determine the level of trust that the first network device has for the third network device, the processing circuitry is further configured to:
    determine attributes of a separation between the first network device and the second network device.

13. The system of claim 12, wherein to determine attributes of the separation between the first network device and the second network device, the processing circuitry is further configured to:
    determine a count of entities that separate the first network device from the third network device.

14. The system of claim 11, wherein a fourth network device neighbors the third network device but does not neighbor the first network device, and wherein the processing circuitry is further configured to:

determine a level of trust that the first network device has for the fourth network device by inferring the level of trust that the first network device has for the fourth network device.

15. The system of claim 11, wherein the processing circuitry is detect a change in the level of trust that the second network device has for the third network device; and further adjust, based on the change in the level of trust that the second network device has for the third network device, the level of trust that the first network device has for the third network device.

16. The system of claim 11, wherein the first network device, the second network device, and the third network device are each network devices, and wherein each of the first network device, the second network device, and the third network device are each connected through a network.

17. The system of claim 16, wherein the first network device is connected to the third network device on the network by a network path through the second network device.

18. A non-transitory computer-readable storage medium comprising instructions that, when executed, configure processing circuitry of a computing system to:

determine a level of trust that a first network device has for a second network device;

determine a level of trust that the second network device has for a third network device;

determine that the first network device is separated from the third network device by the second network device;

determine, based on the level of trust that the first network device has for the second network device and further based on the level of trust that the second network device has for the third network device, a level of trust that the first network device has for the third network device;

enable, based on the level of trust that the first network device has for the third network device, the first network device to perform an operation with the third network device;

detect a change in the level of trust that the first network device has for the second network device; and adjust, based on the change in the level of trust that the first network device has for the second network device, the level of trust that the first network device has for the third network device.

* * * * *